United States Patent [19]
Callan

[11] 3,758,001
[45] Sept. 11, 1973

[54] EXTRUDER
[75] Inventor: John E. Callan, Trenton, N.J.
[73] Assignee: Cities Service Company, New York, N.Y.
[22] Filed: Oct. 29, 1971
[21] Appl. No.: 193,991

[52] U.S. Cl. ............................................. 222/146
[51] Int. Cl. ............................................. B67d 5/62
[58] Field of Search ............... 222/146 HE, 54, 333,
222/413; 263/15 B; 13/24; 239/134, 136;
219/10.65; 425/174, 144, 379, 378, 326; 259/159

[56] References Cited
UNITED STATES PATENTS

| | | | |
|---|---|---|---|
| 3,281,576 | 10/1966 | Cooper et al. ................ | 222/146 HE |
| 3,609,809 | 10/1971 | Slicker ................... | 425/144 |
| 3,284,372 | 11/1966 | Bailey ..................... | 425/144 X |
| 3,207,365 | 9/1965 | Burford et al. ........... | 222/146 HE X |
| 3,604,597 | 9/1971 | Pohl et al. ..................... | 222/146 HE |
| 3,583,028 | 6/1971 | Bely et al. ........................... | 425/379 |
| 3,431,599 | 3/1969 | Fogelberg ..................... | 425/144 X |
| 3,496,603 | 2/1970 | Listner et al. .................. | 425/379 X |
| 2,702,408 | 2/1955 | Hartland ...................... | 425/379 X |
| 3,060,512 | 10/1962 | Martin et al. ................... | 425/379 X |
| 2,288,248 | 6/1942 | Long ........................... | 222/146 HE |
| 3,550,815 | 12/1970 | Solomen ...................... | 222/146 HE |

Primary Examiner—Samuel F. Coleman
Assistant Examiner—Norman L. Stack, Jr.
Attorney—J. Richard Geaman

[57] ABSTRACT

A polymer extruder having heating means which is thermostatically controlled for regulated heating of the extruder barrel and, hence, the material being extruded. In preferred embodiments the extruder barrel is fitted with two longitudinally spaced-apart electric heating elements, each of which is independently controlled with separate thermostats attached to the barrel in the vicinity of the element which it controls. The first heating element is located near the feed inlet of the extruder, and the second near the extrusion orifice. The first element provides high heat input for rapid softening of the polymeric feed. The other element provides additional heat input for extrusion of the polymeric material at a constant, preselected temperature. The invention is especially applicable to hand-held extruders which are operated intermittently for extruding hot tapes during the weather sealing of structural joints.

4 Claims, 2 Drawing Figures

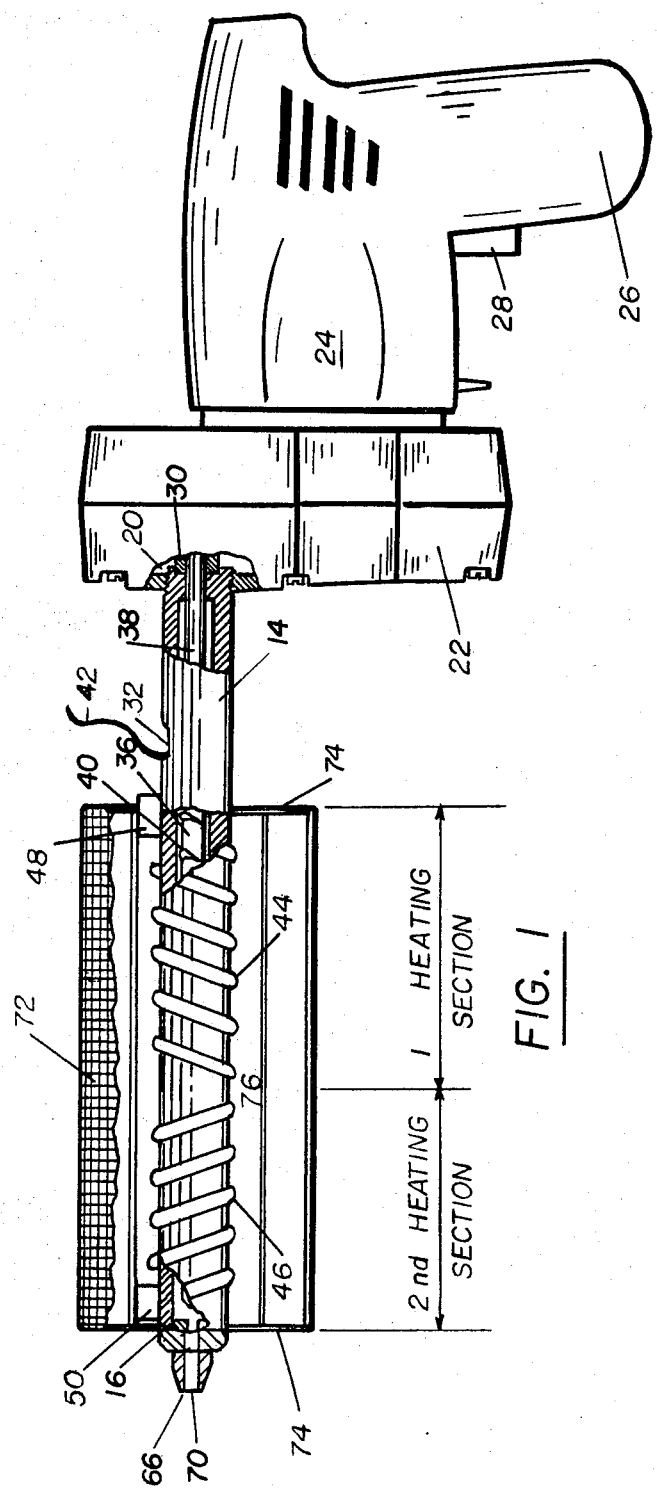

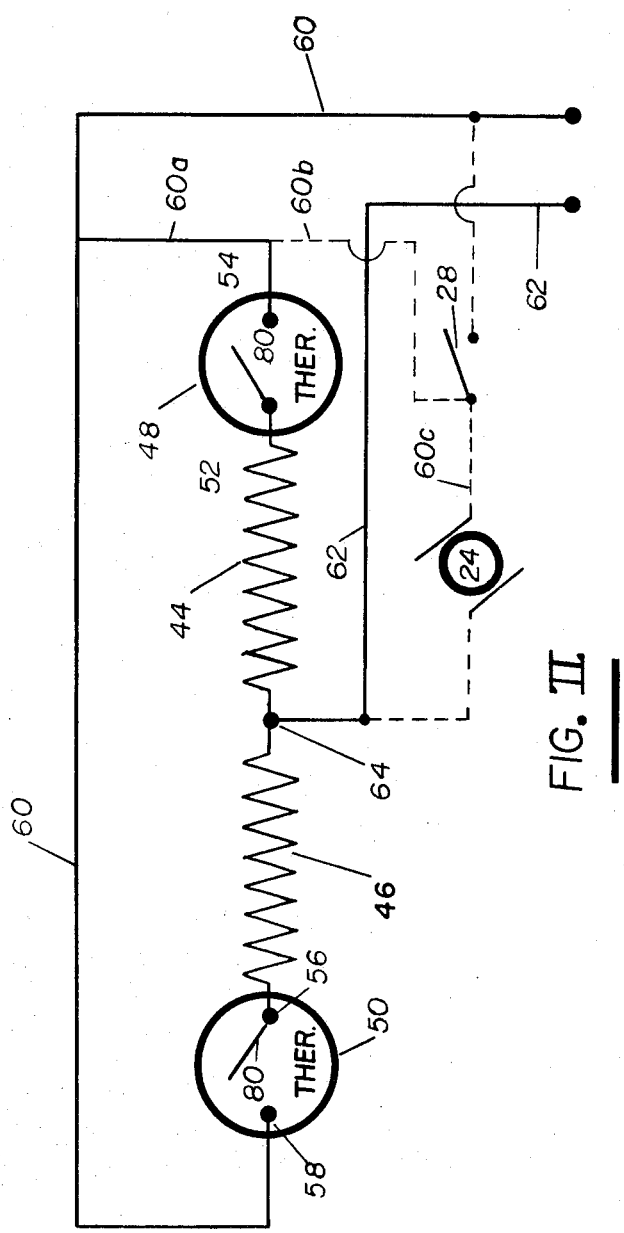
FIG. II

EXTRUDER

BACKGROUND OF THE INVENTION

The present invention pertains to extrusion, and more particularly to improved apparatus and methods for controlled heating of a polymeric material during production of hot polymeric extrudates such as elastomeric sealant tapes which are employed for weather sealing of structural joints.

Elastomeric sealant tapes can be formed by means of an extruder having a heated barrel. An elastomeric sealant composition is fed into one end of the barrel and is extruded out the other end through a suitably shaped orifice. Heating causes the previously-stiff sealant composition to soften, thereby improving the extrudability thereof and enhancing bondability of the resulting tape to substrates on either side of a structural joint being sealed.

Apparatus suitable for producing hot sealant tapes is described in copending patent application Ser. No. 94,810 filed Dec. 3, 1970 and assigned to the same assignee as this application. Improved methods of producing and applying sealant tapes is described in copending application Ser. No. (5098 CIP. 1) filed July 23, 1971, and which is a Continuation-in-Part of aforementioned patent application Ser. No. 94,810.

While the extruder described in application Ser. No. 94,810 has proven satisfactory for the intended purpose, certain problems have arisen which are associated with regulation of the barrel temperature and its coincident effect upon the polymeric material being extruded. If an elastomeric sealant composition is subjected to excessive temperature during extrusion, the elastomer therein will be degraded and/or certain other materials, such as rubber compounding oil, will be boiled off. If, on the otherhand, the heating temperature is too low, the composition is difficult to convey through the extruder and expel from the extrusion orifice, and if the resulting tape is not hot enough it will not have the desired viscosity and bonding characteristics for filling and sealing of the structural joint.

During extrusion, therefore, heat input to the barrel must be high enough to sufficiently soften the sealant and permit extrusion at the desired temperature. However, when extrusion is interrupted for some reason, heat input must be reduced lest sealant which remains in the extruder barrel become overheated. Otherwise, the barrel must be emptied of sealant. Alternatively, the heat to the barrel can be turned down, but in such a case the extruder must be reheated again before the extrusion operation is resumed. These are inconvenient and sometimes impractical handicaps, and a need was therefore recognized for improved regulation of the temperature of the extruder barrel contents.

It is therefore an object of this invention to improve the hot extrusion of polymeric materials.

Another object of this invention is to provide improved regulation of the heat supplied to a polymeric material during production of a hot extrudate thereof.

Even another object of this invention is to automatically regulate the temperature of a polymeric material in an extruder barrel to a constant temperature, even when extrusion of said material is interrupted.

Yet another object of this invention is to provide rapid hot extrusion of a polymeric material without excessive degradation of the polymer or volatilization of ingredients from said material.

Even other objects and advantages of this invention will become apparent from the following description and the appended claims.

SUMMARY OF THE INVENTION

With an extruder having an elongated barrel, an extrusion orifice located at one end of the barrel, a feed inlet located toward the other end, and conveying means for forcing polymeric feed through the barrel and out of the orifice, there is additionally provided a heating means which is thermostatically controlled for regulated heating of the extruder barrel.

Two thermostatically controlled heating means can be employed, the first being contiguous with the extruder barrel in the proximity of the feed inlet and the second being contiguous with the barrel in the proximity of the extrusion orifice.

The heating means can be one or more heating elements controlled by one or more thermostatic switches.

In operation, polymeric material is introduced into the feed inlet of the heated extruder barrel, and it thus passes into one end of a heating zone and is heated therein during transit to the discharge end of the zone. The input of heat to polymeric material contained in the heating zone is thermostatically regulated in response to the detected temperature at the discharge end of the zone, thus preventing overheating of the polymeric material and permitting the extrusion thereof at a constant temperature.

By use of two thermostatically controlled heating means, the heating zone in the extruder barrel can have two sections, and the amount of heat supplied to each section can be independently regulated thermostatically. Accordingly, the thermal energy input to the polymeric material upon entering the extruder can be at a relatively high rate, thus permitting rapid heat-up and softening of the feed in the first section of the heating zone, and followed by input of an additional increment of thermal energy in the second section of the zone to heat the polymeric material to the temperature at which it is to be extruded.

Should the extrusion operation be interrupted, thermostatic regulation of the heating remains in effect, thus preventing overheating of the extruder and its polymeric contents during the nonoperational period. Furthermore, the extruder and its contents are at the necessary temperature whenever extrusion is resumed, i.e. no preliminary heat-up is required.

It will therefore be understood that the temperature to which the polymeric material is heated and maintained within the extruder is not so high as to detrimentally degrade or devolatilize the material, but is nonetheless high enough to facilitate the extrusion and provide an extrudate having the desired bonding characteristics and/or viscosity.

As will be appreciated, the present invention can be used for hot extrusion and application of elastomeric sealant tapes as described in the aforementioned patent applications, and is especially useful when extrusion and application of the tape is intermittent as opposed to fully continuous.

BRIEF DESCRIPTION OF THE DRAWINGS

FIG. 1 is a side view, partly in section, of a hand-held sealant tape extruder having the invention embodied therein and using electric heating elements controlled by thermostatic switches as the means for regulated heating of the extruder barrel.

FIG. 2 is an electric circuit diagram of the heating means employed in FIG. 1.

DETAILED DESCRIPTION OF THE INVENTION

The terms "thermostat," "thermostatic," and "thermostatically" which are used herein are with reference to a temperature control device having a thermal sensor which reacts to a detected change in temperature of the environment in which the sensor is located, and which effects a raising or lowering of the temperature by starting, stopping or altering the supply of thermal energy to the environment. Thus a bimetalic element, expandable metal rod, bellows, or thermocouple can function as a thermal sensor that operates a switch for an electric heater or a solinoid actuator for a valve which controls the flow of a heated fluid. Either electricity or a heated fluid such as steam, oil, or the like can function as a source of thermal energy for supplying heat to the extruder barrel, although an electric heating element in conjunction with a thermostatic switch is preferred.

The thermostat can be of the "preset" variety, which means that it will turn the heat source on and off at either end of a fixed temperature range which can be either very narrow or several degrees wide. More preferably, an adjustable thermostat is employed since it permits shifting of the operating range upward or downward when it is desirable to change the temperature at which the polymeric material is extruded. The term "constant temperature" as used herein is intended to mean a slight range of temperature within which the thermostat operates, thus making allowance for small deviations of temperature within this range. Therefore, the terms "thermostatically controlled" or "regulated thermostatically" as used herein are intended to mean the establishment and/or maintenance of a constant temperature by means of a thermostat, thus altering the input of thermal energy to the extruder and, hence, to the polymeric contents thereof by response of the heat supplying means to a temperature change detected by the thermal sensor of the thermostat.

The term "polymeric material" as used herein is intended to mean any polymer, polymeric mixture, or polymeric composition which can be heated and extruded at a plastic-like consistency, e.g. thermoplastics, elastomers, mixtures thereof, and compositions wherein these materials form the base. As previously indicated, the present invention is particularly useful in the extrusion of elastomeric sealant compositions when making hot sealant tapes and applying the same to structural joint requiring a seal.

The terms "elastomeric sealant compositions" and "sealant tapes" as are used herein are intended to have the same meaning as defined in the previously-mentioned patent application (Case 5098 CIP-1).

Referring now to the drawings, FIG. 1 shows a hand-held extruder gun which can be used for the simultaneous hot extrusion and application of sealant tapes to structural joints which require sealing against the weather.

The gun has a metal extruder barrel 14 in the form of an elongated hollow cylinder. The discharge end 16 of the barrel 14 is threaded to receive an extrusion die 66 having an extrusion orifice 70 which is suitably shaped to provide an extrudate having a desired cross-sectional configuration. The other end of the barrel 20 is externally threaded to receive a drive means comprising, generally, a speed-reducing transmission 22 and an electric drive motor 24. The handle of the motor has a pistol grip 26 with a trigger switch 28 for activating the motor.

A collet 30 is internally mounted as the output element of the transmission 22 and is connected to a rotatable extruding screw 36 by means of shank 38. The extruding screw is axially mounted in the interior of the barrel 14 and has a helix 40 which extends radially from the shank and is integral therewith. The pitch of the helix can be varied depending upon the particular type of polymeric material being dispensed, the dispensing speed desired, etc. As shown, the screw has a 2 to 1 pitch ratio and a length to diameter ratio of 12 to 1. It will be understood that other pitch ratios and length to diameter ratios can also be used.

Adjacent the junction of the shank 38 and the helix portion 40 of the screw 36 is a feed inlet 32 for the extruder barrel 14 and by means of which polymeric material can be continuously fed into the gun as a "rope," strand, or tape 42. With the motor 24 operating, feed to the extruder is thus automatic, i.e. the tape is continuously pulled into the barrel by rotation of the screw 36. Thereafter, the polymeric material is conveyed down the barrel 14, is heated therein, and is then extruded from orifice 70.

In the illustrated case two electric heating elements are employed for heating the barrel 14 and, hence, the contents thereof. The first heating element 44 is wrapped around the barrel 14 toward the fed-end 20 thereof in the vicinity of the feed inlet 32. The second heating element 46 is wrapped around the barrel toward the dicharge end 16 thereof in the vicinity of the extrusion orifice 70. The interior of the extruder barrel is thus a heating zone which extends from the fed-end to the discharge end of the barrel.

In accordance with the embodiment of the invention shown in the drawings, the heating zone in the extruder barrel has two interconnecting heating sections bounded by heating elements 44 and 46, respectively. These sections are designated First Heating Section and Second Heating Section in FIG. 1. Each has an inlet end (right end) and a discharge end (left end) for the polymeric material, and the discharge end of the first merges directly into the inlet end of the second. Thermostatic switches 48 and 50 are employed in conjunction with heating elements 44 and 46 respectively. Switch 48 is fastened securely to the barrel 14 near the feed inlet therefor, whereas switch 50 is fastened securely to the barrel near the extrusion orifice 70. With respect to the two heating sections, thermostatic switch 48 is thus located at the inlet end of the first section and regulates the temperature in that section in response to the thermostatically detected temperature at the inlet end thereof. On the otherhand, thermostatic switch 50 is located at the discharge end of the second heating section to regulate the temperature therein to the thermostatically detected temperature at the discharge end.

Referring to FIG. 2, it can be seen that one terminal 52 of switch 48 is connected to the heating element 44 whereas the other terminal 54 of the switch is connected to a power-supplying lead 60. Switch 50 is connected in the same fashion, i.e. terminal 56 is connected to the main power lead 60 through a secondary lead 60a. Both heating elements are grounded through common lead 62 by attachment at terminal 64. Leads 60 and 62 can be connected to a conventional A.C. power source, not shown.

As the thermal sensors which react to changes in temperature and thus alter the supply of heat to the extruder barrel, each switch has a bimetalic element 80 which flexes back and forth under the influence of changes in temperature, thus opening the connection between the switch terminals when the termperature rises above a certain limit, and closing the connection when the temperature falls below a certain limit. Conveniently, therefore, the thermostatic switches are of the normally closed variety and they can also be equipped with adjusting means, such as a screw, for changing the temperature range over which they operate to supply and interrupt power to the heating elements.

In order to quickly heat up and soften the incoming polymer feed, the first heating element 44 can have a higher wattage rating than the second element 46, and the first thermostatic switch 48 can have a setting which interrupts the power to element 44 at a temperature higher than that at which thermostatic switch 50 effects an interruption to the element 46. Since the incoming polymeric material is relatively cold, higher heat input and temperature are needed for rapid softening and, hence, rapid feeding and conveying of the material. However, it will be understood that the polymeric material is not necessarily heated up to the desired extrusion temperature during passage through the first section of the heating zone, and the purpose of the two heating sections is thus explained, i.e. rapid softening is accomplished by heating in the first section whereas another incriment of the thermal energy is added in the second section to bring the polymeric material up to the desired extrusion temperature. Of course, neither thermostat is set to establish and maintain a temperature in either heating section which would result in detrimental degrading or volatilization of the polymeric material.

As previously described, two heating elements having separate thermostatic switches for the control thereof can be wired independently of the electric motor 24. In another advantageous embodiment of the invention the first thermostatic switch, e.g. 48, can be wired in parallel with the trigger switch 28 for the electric drive motor 24. In such a case, the first heating element e.g. 44, is nonoperative whenever the trigger switch 28 is not depressed, i.e. the heating element is off and no heat is supplied to the first section of the heating zone whenever the drive motor 24 is off. Such an arrangement is illustrated in FIG. 2. Terminal 54 of thermostat 48 can be connected by means of an optional secondary power lead 60b to one terminal of the trigger switch 28 whereas the motor 24 is connected to the same terminal through optional secondary power lead 60c, and in which case secondary power lead 60a is left out of the circuit. Thus arranged, power to heating element 44 cannot be supplied through thermostat 48, even if the contacts thereof are closed, until the trigger switch is closed, but the motor 24 will operate whenever the trigger switch is depressed, regardless of whether thermostat switch 48 is closed or not. Accordingly, there is high heat input to the polymeric material in the first section of the heating zone only when trigger switch 28 and thermostatic switch 48 are both closed, thus not exposing the polymeric material to unnecessary heating during periods of non-extrusion, but making high heat input available whenever the motor is started and extrusion commences.

While the illustrated extruder gun is equipped with two heating elements with independent thermostatic switches for each, it will be understood that—provided the polymeric material being fed to the extruder is not too stiff—only one element need be employed for the extruder barrel in conjunction with one thermostatic switch located near the discharge end of the barrel, e.g. thermostatic control switch 50, while also providing the barrel with sufficient length to effect heat-up to extrusion temperature. However, the present invention permits use of a shorter and more manageable gun by affording a short barrel length which can be used even with highly viscous polymeric materials.

A guard 72 for protection of the operator against burns surrounds the barrel 14 of the extruder gun and is mounted on radially extending stand-offs 74 so as to create an air gap 76 between the guard and the heating elements on the barrel. The guard and the stand-offs are ventilated to allow air flow between the guard and the elements. For ease of manipulation and safer use, the gun may be provided with a handle, not shown, located toward the discharge end of the barrel. Preferably this handle is heat insulated and can be attached to the guard 72. It is also generally preferable that an insulating material such as asbestos or Fiberfrax be applied over the heating elements and thermostatic switches in order to direct the heat into the barrel, thus providing for more uniform, constant, and economical heating, while also reducing the amount of heat directed onto the guard.

A better understanding of the utility of the present invention can be obtained from aforementioned patent application (Case 5098 CIP-1). As indicated therein, elastomeric sealants which are most resistant to flow and creep upon exposure to weather can nonetheless be too stiff at room temperature for applying to and bonding with the substrates on either side of a structural joint. However, by simultaneously heating, extruding, and applying the tapes at a temperature within the range of about 200°-300°F., the viscosity of the sealant is reduced to a point where it can be easily installed and the bondability thereof is greatly improved. Furthermore, when the sealant has cooled down to ambient temperature after installation, the viscosity thereof is once again high enough to provide outstanding resistance to sag and creep.

The present invention has been described with particular reference to electrical heating of the extruder barrel, but it will be appreciated that other heating means can be employed alternatively, e.g. superheated steam which is circulated through one or more jackets on the extruder barrel. Furthermore, the heat supplied by such means can also be regulated by readily available thermostatic control devices designed for use with fluids instead of electricity.

It will also be understood that while the invention set forth herein is particularly applicable to portable, hand-held extruders, it is equally applicable to control of extrusion temperatures in stationary extruders. In addition, other modifications and variations will become apparent which are nonetheless embodied within the spirit and scope of the invention defined by the appended claims.

Therefore, what is claimed is:

1. A hand-held extruder gun for extrusion and application of an elastomeric sealant composition to a structural joint which comprises:
   a. an elongated cylindrical extruder barrel having a fed end and a discharge end, an inlet at the fed end for a strand of elastomeric sealant composition that is to be heated and extruded, and an extrusion orifice at the discharge end for extruding and applying the fed elastomeric sealant composition as a heated sealant tape,
   b. a rotatable extruding screw axially mounted within said barrel, said screw being connected toward the fed end of the barrel to a drive means powered with an electric motor to which the supply of electric power can be turned on and off, and whereupon rotation of said screw by the drive means said strand of sealant composition is pulled through said inlet into the barrel and conveyed through the barrel by the rotating action of the screw,
   c. a first electric heating element contiguous with said barrel toward the fed end thereof, flow of electric power to said first element being regulated by a first normally closed thermostatic switch attached to said barrel and which senses and reacts to the temperature of the fed end of the barrel, said first element being wired to receive electric power only when power is supplied to the electric motor of the drive means and also when said first thermostatic switch is closed,
   d. a second electric heating element contiguous with said barrel toward the discharge end thereof, flow of electric power to said first element being regulated by a second normally closed thermostatic switch attached to said barrel and which senses and reacts to the temperature of the discharge end of the barrel, said first electric element being adapted to supply heat to said barrel at a faster rate than said second electric element, and whereupon supplying power to said electric motor said sealant composition that is drawn into the barrel is rapidly heated and softened in the fed end of the barrel by heating of the first electric element and is heated in the discharge end of the barrel by heating of the second electric element, supply of electric power to said first element being interrupted upon turning off electric power to said drive motor or upon opening of the first thermostatic switch, and supply of electric power to said second element being interrupted by opening of the second thermostatic switch, and further comprising
   e. means for holding, operating and manipulating the extruder gun by hand.

2. A process for producing a hot sealant tape which comprises feeding an elastomeric sealant composition into the first section of a heating zone and then passing said sealant composition into a second interconnecting section of said zone, the input of heat into the first and second sections of the heating zone being regulated independently, heat being supplied to said first section only during transit of said sealant composition through the first section and at which time heat is supplied to said first section at a higher rate than it is supplied to the second section, and extruding the elastomeric sealant composition as a heated sealant tape subsequent to discharge of said composition from the second section of the heating zone.

3. A process as defined in claim 2 wherein the heat input to the first section of the heating zone is regulated in response to the temperature detected at the inlet of said first section and the heat input to said second section is regulated in response to the temperature detected at the outlet of the second section.

4. A process as defined in claim 2 wherein the temperature to which the elastomeric sealant composition is heated in the second section of the heating zone is higher than that to which it is heated in the first section thereof.

* * * * *